United States Patent [19]

Calhoun

[11] Patent Number: 5,399,612
[45] Date of Patent: Mar. 21, 1995

[54] BLENDED POLYMERIC COMPOSITIONS

[75] Inventor: Glenn C. Calhoun, Mt. Pleasant, Wis.

[73] Assignee: S. C. Johnson & Son, Inc., Racine, Wis.

[21] Appl. No.: 35,539

[22] Filed: Mar. 23, 1993

Related U.S. Application Data

[63] Continuation of Ser. No. 663,331, Feb. 14, 1991, abandoned, which is a continuation-in-part of Ser. No. 631,611, Dec. 20, 1990, abandoned.

[51] Int. Cl.⁶ ............................................. C08L 83/08
[52] U.S. Cl. .................................. 524/506; 524/556; 525/100; 525/102; 525/103; 427/387; 428/447
[58] Field of Search ...................... 525/100, 102, 103; 524/506, 556; 428/447; 427/387

[56] References Cited

U.S. PATENT DOCUMENTS

| | | | |
|---|---|---|---|
| Re. 31,406 | 10/1983 | Gaylord | 526/279 |
| 3,075,941 | 1/1963 | Wynstra et al. | 523/500 |
| 3,203,919 | 8/1965 | Brachman | 524/269 |
| 3,328,367 | 6/1967 | Rees | 525/328.5 |
| 3,404,134 | 10/1968 | Rees | 525/328.5 |
| 3,437,512 | 4/1969 | Burlant et al. | 525/479 |
| 3,437,513 | 4/1969 | Burlant et al. | 525/479 |
| 3,467,634 | 9/1969 | Jacknow et al. | 526/279 |
| 3,471,460 | 10/1969 | Rees | 525/329.9 |
| 3,488,304 | 1/1970 | Baugh et al. | 525/7.2 |
| 3,575,910 | 4/1971 | Thomas | 524/588 |
| 3,576,779 | 4/1971 | Holdstock et al. | 524/588 |
| 3,577,264 | 5/1971 | Nordstrom | 525/475 |
| 3,617,362 | 11/1971 | Bemmels et al. | 117/122 |
| 3,627,836 | 12/1971 | Getson | 525/475 |
| 3,631,087 | 12/1971 | Lewis et al. | 525/479 |
| 3,661,628 | 5/1972 | Marsden | 524/506 |
| 3,694,478 | 9/1972 | Adams et al. | 525/479 |
| 3,714,288 | 1/1973 | Nordstrom | 526/279 |
| 3,776,875 | 12/1973 | Getson | 525/479 |
| 3,794,694 | 2/1974 | Chadha et al. | 528/25 |
| 3,808,178 | 4/1974 | Gaylord | 526/279 |
| 3,836,598 | 9/1974 | Wheeler, Jr. | 525/263 |
| 3,878,263 | 4/1975 | Martin | 526/276 |
| 3,997,492 | 12/1976 | Kane et al. | |
| 4,032,499 | 6/1977 | Kreuzer et al. | 525/479 |
| 4,070,152 | 1/1978 | Pentz | 8/115.6 |
| 4,070,414 | 1/1978 | Falender et al. | 525/479 |
| 4,136,250 | 1/1979 | Mueller et al. | 528/29 |
| 4,139,519 | 2/1979 | Itoh et al. | 528/25 |
| 4,152,508 | 5/1979 | Ellis et al. | 526/279 |
| 4,153,641 | 5/1979 | Deichert et al. | 526/279 |
| 4,154,618 | 5/1979 | Burke | 106/27 |

(List continued on next page.)

FOREIGN PATENT DOCUMENTS

| | | |
|---|---|---|
| 0068671A2 | 1/1983 | European Pat. Off. . |
| 220400 | 5/1987 | European Pat. Off. ... D06M 15/227 |
| 412324 | 2/1991 | European Pat. Off. ... D06M 15/227 |
| 59-59750 | 4/1984 | Japan . |
| 59-059750 | 4/1984 | Japan ................. 525/100 |

OTHER PUBLICATIONS

Supplementary European Search Report, EP Ser. No. EP 92906794.0 dated 24 Aug., 1993, including amended claims from PCT/US92/00643, 9 pages.

(List continued on next page.)

Primary Examiner—Ralph H. Dean
Attorney, Agent, or Firm—R. E. Rakoczy; J. W. Frank

[57] ABSTRACT

Novel polymeric compositions are disclosed. The polymeric compositions, in particular, are either soluble or readily dispersible in water. Such polymeric compositions can be characterized as polymeric blends containing at least one acid-functional vinyl polymer and at least one amino-functional siloxane polymer. The novel polymeric blends further include volatile aqueous media comprising water and base in an amount that is effective for preventing the acid-functional moieties of the vinyl polymer from chemically reacting with the amino-functional moieties of the siloxane polymer. Such compositions or "blends", in general, comprise 60–99.9 parts-by-weight of the acid-functional vinyl polymer and 0.1–40 parts-by-weight of the amino-functional siloxane polymer, based upon total weight of the blended polymeric composition. Also disclosed are methods of producing the blended polymeric composition. The blended polymeric compositions are able to provide various substrates with surface coatings that are characterized as quasi-crosslinked, alkali-soluble polymeric networks exhibiting enhanced surface properties.

21 Claims, No Drawings

U.S. PATENT DOCUMENTS

| | | | |
|---|---|---|---|
| 4,166,078 | 8/1979 | Getson | 528/26 |
| 4,189,546 | 2/1980 | Deichert et al. | 528/26 |
| 4,208,506 | 6/1980 | Deichert et al. | 528/32 |
| 4,216,303 | 8/1980 | Novicky | 528/32 |
| 4,242,483 | 12/1980 | Novicky | 526/267 |
| 4,248,989 | 2/1981 | Novicky | 526/264 |
| 4,276,402 | 6/1981 | Chromecek et al. | 526/264 |
| 4,314,068 | 2/1982 | Novicky | 556/440 |
| 4,322,517 | 3/1982 | Deubzer et al. | 528/14 |
| 4,336,358 | 6/1982 | Alberts et al. | 525/439 |
| 4,341,889 | 7/1982 | Deichert et al. | 528/26 |
| 4,348,454 | 9/1982 | Eckberg | 428/334 |
| 4,352,917 | 10/1982 | Tripp | 528/26 |
| 4,355,147 | 10/1982 | Deichert et al. | 526/264 |
| 4,358,391 | 11/1982 | Finkelmann et al. | 252/299.01 |
| 4,368,290 | 1/1983 | Alberts et al. | 525/27 |
| 4,413,104 | 11/1983 | Deubzer et al. | 525/475 |
| 4,423,195 | 12/1983 | Covington | 525/479 |
| 4,450,264 | 5/1984 | Cho | 526/275 |
| 4,452,961 | 6/1984 | Koerner et al. | 526/26 |
| 4,463,127 | 7/1984 | Alberts et al. | 524/731 |
| 4,508,884 | 4/1985 | Wittmann et al. | 526/279 |
| 4,529,787 | 7/1985 | Schmidt et al. | 526/317 |
| 4,535,126 | 8/1985 | Iida | 525/106 |
| 4,546,160 | 10/1985 | Brand et al. | 526/320 |
| 4,552,941 | 11/1985 | Keogh | 528/16 |
| 4,558,082 | 12/1985 | Eckberg | 524/104 |
| 4,565,846 | 1/1986 | Saito et al. | 525/101 |
| 4,581,184 | 4/1986 | Powell | 264/2.6 |
| 4,600,657 | 7/1986 | Wegehaupt et al. | 428/447 |
| 4,611,039 | 9/1986 | Powell et al. | 526/271 |
| 4,619,973 | 10/1986 | Smith, Jr. | 525/329.9 |
| 4,623,683 | 11/1986 | Villarreal | 524/47 |
| 4,661,551 | 4/1987 | Mayer et al. | 524/379 |
| 4,663,228 | 5/1987 | Bolton et al. | 428/334 |
| 4,670,500 | 6/1987 | Gupta | 524/447 |
| 4,673,718 | 6/1987 | Ryntz et al. | 525/476 |
| 4,677,169 | 6/1987 | Crivello | 525/475 |
| 4,678,846 | 7/1987 | Weitemeyer et al. | 525/477 |
| 4,693,935 | 9/1987 | Mazurek | 428/352 |
| 4,767,646 | 8/1988 | Cordova et al. | 427/387 |
| 4,960,431 | 10/1990 | Cordova et al. | 8/115.6 |
| 5,078,747 | 1/1992 | Kastele et al. | 8/181 |

OTHER PUBLICATIONS

Styrenic And Acrylic-Siloxane Block And Graft Copolymers by S. D. Smith & J. E. McGrath, pp. 31–33.

Surface Effects In Siloxane-Containing Methacrylates by Hsu, Kanter & Mazurek, at pp. 562–566.

Technical Bulletin pub. by Wacker Silicones Corporation entitled "Silicone Fluid F-756".

Technical Bulletin pub. by Wacker Silicones Corporation entitled "Silicone Fluid F-815".

Technical Bulletin pub. by Wacker Silicones Corporation entitled "Silicone Fluid F-881A".

Technical Bulletin pub. by Wacker Silicones Corporation entitled "Silicone Fluid EF-14881".

Vol. 4, Encyclopedia of Polymer Science and Engineering, 2nd Ed. pub. 1986 by John Wiley & Sons of N.Y., pp. 405–408.

The ACS Symposium Series (Ring-Opening Polymerization) by Kawakami & Yamashita, pub. 1985 by American Chem. Society, pp. 245–261.

Sales literature for TRITON X-45 mentioned in McCutcheon's Emulsifiers & Detergents, 1990, p. 192.

Technical Journal, Chemical & Engineering News published by American Chemical Society at p. 31.

BLENDED POLYMERIC COMPOSITIONS

REFERENCE TO RELATED APPLICATION

This is a continuation of application Ser. No. 07/663,331, filed on Feb. 14, 1991, now abandoned, which is a continuation-in-part of Prior Complete U.S. application Ser. No. 07/631,611 (filed Dec. 20, 1990) now abandoned, the benefit of which is now claimed for purposes of priority pursuant to 35 USC § 120.

TECHNICAL FIELD

This invention is directed to polymeric compositions that may either be soluble or readily dispersible in water and which can otherwise be characterized as "blended" polymeric compositions or simply "blends" containing at least one acid-functional vinyl polymer and at least one amino-functional siloxane polymer. The vinyl polymer has at least two acid-functional pendant moieties; and the siloxane polymer has at least two amino-functional pendant moieties. Such blended polymeric compositions are able to provide various substrates with surface coatings that are characterized as "quasi-crosslinked", alkali-soluble polymeric networks exhibiting enhanced surface properties.

BACKGROUND ART

A number of scientists who are skilled in the art of surface coatings are well aware of certain so-called "ionomeric" resins. "Ionomeric" resins are, perhaps, more particularly characterized as "ionic copolymers". In any event, such substances—whether called "ionomeric" resins or "ionic copolymers"—are well-known useful, commercially-available surface-coating materials.

In particular, U.S. Pat. Nos. 3,328,367; 3,404,134; and 3,471,460, all to Rees, each disclose certain carboxylic acid-containing copolymers having structurally-specific organic diamine radicals that are associated with the ionized carboxyl groups of the copolymer. Indeed, ionically crosslinked "ethylene/methacrylic" acid-containing copolymers as well as "ethylene/acrylic" acid-containing copolymers are both illustrative of commercially-available extrudable "ionomeric" resins of this sort. Additional "ionomeric" resins are disclosed in U.S. Pat. No. 4,154,618 to Burke; in U.S. Pat. No. 4,619,973 to Smith, Jr.; and in U.S. Pat. No. 4,663,228 to Bolton et al.

Certain so-called "polysiloxanes" are other well-known, useful, commercially-available surface-coating materials.

In this regard, various commercially-available polysiloxanes are well-known for their resistance-to-water as well as for their ability to form surface coatings or films exhibiting relatively low surface energy, both desirable physical properties.

Polysiloxanes—often technically referred to as "inorganic" polymers—can be rendered at least partially "organic" in nature by the incorporation of certain organic groups. For example, the incorporation of specified organo amine groups into such so-called "inorganic" polysiloxanes is known to provide such polysiloxanes with certain desired amino-functional "activity" properties. In particular, U.S. Pat. No. 3,576,779 to Holdstock et al. is illustrative of a composition-of-matter, characterized as a "salt", which is produced from an amino moiety-containing organo siloxane copolymer and an aliphatic carboxylic acid. U.S. Pat. No. 3,631,087 to Lewis et al. is illustrative of yet another composition-of-matter of this sort, characterized as a so-called "grafted" organo polysiloxane of specified structure. In the '087 patent, an amino moiety is said to be able to be grafted onto the polysiloxane backbone to provide a desired pendant functional group; and polymerizable "organic" monomers such as acrylic acid and derivatives thereof are said to be able to be thus grafted onto the organo polysiloxane. U.S. Pat. No. 4,661,551 to Mayer et al. is illustrative of still another known organo polysiloxane composition-of-matter that is said to include a salt of a water-soluble organic or inorganic acid and a polysiloxane. U.S. Pat. No. 4,670,500 to Gupta discloses yet another coating composition-of-matter or film of this sort, that is said to include an amino-functional silicone polymer as well as a so-called "metal-chelated" type of acrylic polymer. In the '500 patent, such a coating composition is characterized as a blend.

Alkali-soluble coatings that are able to provide various substrate surfaces with enhanced "slip" qualities and that are also able to provide such substrates with water-resistance, solvent-resistance, and/or corrosion-resistance characteristics are presently in great commercial demand.

Moreover, for a variety of reasons, it would be both desirable and advantageous to be able to obtain "ionomeric" crosslinkable compositions-of-matter, utilizing aqueous media, or carrier, wherein such compositions are able to contain an acid-functional vinyl polymer and a water-insoluble amino-functional polysiloxane. Indeed, there are at present a number of reasons that render use of any organic solvent, as media or carrier, as highly undesirable.

For example, there is at present a considerable amount of governmental, commercial and other interest concerning the reduction of the total amount of volatile organic compounds ("VOCs") that are present in various commercial and consumer-oriented compositions-of-matter and/or formulations. It would accordingly be desirable that a polymeric blend, used to apply a surface coating to a substrate, be water-based.

In this regard, my novel blended polymeric compositions are either totally soluble or readily dispersible in water. As a result, my novel blended polymeric compositions are therefore presently highly desirable. I have, for example, observed that the blended polymeric compositions of my invention, when applied via aqueous solution to various substrates, are able to provide such substrates with enhanced solvent-resistance (in certain situations), with water-resistance, and with corrosion-resistance characteristic properties. Such substrates include but are not limited to asphalt, cardboard, ceramics, concrete, fabrics, glass, linoleum, metal, paper, plastic, stone, tile, wood, and a wide assortment of other porous and nonporous surfaces.

SUMMARY DISCLOSURE OF INVENTION

One aspect of my invention is directed to certain novel blended polymeric compositions-of-matter which, because of their unique physical makeup, may either be soluble or readily dispersible in water. My novel polymeric compositions can, perhaps more particularly in this regard, be characterized as "blends" containing at least one acid-functional vinyl polymer and at least one amino-functional siloxane polymer. The polymeric compositions of my invention are able to provide various substrates with surface coatings that are characterized as "quasi-crosslinked", alkali-soluble polymeric networks exhibiting certain desirable surface properties.

Such blended polymeric compositions (or "blends"), in general, comprise 60–99.9 parts-by-weight of the acid-functional vinyl polymer and 0.1–40 parts-by-weight of the amino-functional siloxane polymer. The vinyl polymer has at least two acid-functional pendant moieties; and the siloxane polymer has at least two amino-functional pendant moieties. The siloxane polymer, in particular, may have pendant amino-functional groups on at least two different side chains, or may have pendant amino-functional groups on at least two different chain terminal ends, or may have two different pendant amino-functional groups present, one of which is present on a side chain and the other of which is present on a chain terminal end.

The novel polymeric blend of my invention is most preferably "delivered" from aqueous media. When thus delivered, the aqueous formulation, which includes my novel polymeric blend, accordingly includes water as a necessary ingredient, and further includes an alkaline or "basic" ingredient in an amount that is effective for preventing the acid-functional moieties of the vinyl polymer in the aqueous blend from chemically reacting with the amino-functional moieties of the siloxane polymer in the blend. Such a base is preferably volatile. The novel polymeric blend of my invention may thus further be characterized as "volatile aqueous media", with the above-noted base being dissolved in (or dispersed throughout) such media, for purposes of producing an evaporable aqueous solution containing not only the acid-functional vinyl polymer but also the amino-functional siloxane polymer.

The aqueous "blends" of the present invention thus also necessarily include volatile components in addition to the above-mentioned acid-functional vinyl and amino-functional siloxane polymeric ingredients.

Another aspect of my invention is directed to a method of applying the novel aqueous polymeric blended compositions to a substrate surface for the purpose of producing on the substrate surface a "quasi-crosslinked", alkali-soluble polymeric network.

Other aspects and features of my invention will be discussed in detail further hereinbelow.

Industrial Applicability

For a variety of reasons, the thus-dissolved or thus-dispersed aqueous polymeric compositions of this invention may initially be cloudy at the time they are produced or after a period of time in storage; but I have observed that the aqueous blended polymeric compositions-of-matter of this invention generally become clear upon mixing. Moreover, upon evaporation of the volatile components, the aqueous blended polymeric compositions of this invention are able to provide various substrates with "quasi-crosslinked", alkali-soluble polymeric networks exhibiting a number of enhanced surface properties or characteristics. Suitable substrates for such a purpose are enumerated hereinabove.

The quasi-crosslinked polymeric networks thus-provided, typically exhibit not only water-resistance characteristics or physical properties but may also provide certain "enhanced" solvent-resistance physical properties as well. For example, those solvents to which the quasi-crosslinked polymeric network exhibits solvent-resistance characteristics include aromatic hydrocarbons such as benzene, toluene, and xylene. Other solvents to which the polymeric network exhibits solvent-resistance physical properties or characteristics include aliphatic hydrocarbons such as pentane, hexane, and the petroleum oil distillate known as "Petroleum Ether". (See, e.g., page 551 of the textbook entitled "Handbook of Chemical Synonyms and Trade Names", published 1978 by The Technical Press, Ltd., Oxford, England.). Still other well-known illustrative organic solvents in this regard include esters; ethers; ketones; nitrated or chlorinated hydrocarbons; and alcohols.

Still further, and depending upon the relative amounts of both acid-functional vinyl polymer and amino-functional siloxane polymer that are present in the unique compositional make-up of my novel blend, the thus-blended polymeric compositions can be so formulated as to be able to provide so-called "quasi-crosslinked" polymeric networks exhibiting not only preselected water-resistance and solvent-resistance physical properties or characteristics but also certain enhanced film-integrity physical properties as well.

Furthermore, and depending upon the total amount of siloxane polymer that is present in the compositional makeup, the blended polymeric compositions can readily be so formulated as to provide quasi-crosslinked polymeric networks exhibiting a marked decrease in the co-efficient of friction. (That is, the so-called "slip" quality of a particular coating or film can be increased markedly.) Those skilled in the art know full well that such a physical property or characteristic can, at times, be highly desirable.

The aqueous blended polymeric compositions of this invention are thus particularly useful for purposes of providing a suitable substrate with a water-borne surface coating or film. The blended polymeric compositions of this invention may also be incorporated into various presently-known water-borne coating formulations, as well as certain well-known film-forming ingredients, for purposes of enhancing certain physical properties or characteristics of those coating formulations which are presently produced by known methods. For example, the novel blended polymeric compositions of my invention may be incorporated into certain coating compositions of the type disclosed in U.S. Pat. Nos. 3,308,078 and 3,320,196, both to Rogers.

BEST MODE FOR CARRYING OUT THE INVENTION

The compositions or blends of my invention, in general, comprise 60–99.9 parts-by-weight of an acid-functional vinyl polymer and 0.1–40 parts-by-weight of an amino-functional siloxane polymer, based upon total weight of the vinyl-containing and siloxane-containing blended polymeric composition. Preferably, the blends comprise 80–99.9 parts-by-weight of the acid-functional vinyl polymer and 0.1–20 parts-by-weight of the amino-functional siloxane polymer. Moreover, as was briefly mentioned above, the vinyl polymer has at least two acid-functional pendant moieties; and the siloxane polymer has at least two amino-functional pendant moieties.

The blend further includes, as was mentioned above, a sufficient amount of volatile aqueous media, and base in the media, for purposes of producing an evaporable aqueous solution containing not only the acid-functional vinyl polymer but also the amino-functional siloxane polymer. The amount of base, in the aqueous media, is effective for preventing the acid-functional moieties of the vinyl polymer from reacting with the amino-functional moieties of the siloxane polymer. Such a "basic" ingredient is preferably volatile.

The volatile aqueous media thus typically comprises water and base.

The volatile aqueous media may optionally further include such water-miscible volatile organic liquids as acetone, alcohol, ether, glyme, diglyme, ethylene and propylene glycol, glycerol, so-called "low molecular weight" polyethylene oxide as well as its alkyl and dialkyl ethers (i.e., oxides and ethers having a number-average molecular weight of less than about 200), di-methyl formamide, dimethyl acetamide, N-methyl-2-pyrrolidone ("NMP"), and various mixtures and combinations thereof.

However, and as was mentioned above, it may be desirable to minimize the amount of any such organic solvent that is incorporated into the polymeric blends of my invention.

Further in accordance with the principles of the present invention, suitable volatile base is selected from the group consisting of volatile amines, ammonia, and various mixtures thereof. Volatile amines that are suitable for purposes of my invention include but are not limited to methyl amine, dimethyl amine, trimethyl amine, ethyl amine, diethyl amine, triethyl amine, propyl amine, isopropyl amine, di-isopropyl amine, dipropyl amine, butyl amine, sec-butyl amine, tert-butyl amine, and various mixtures and combinations thereof.

Preferably, the acid-functional vinyl polymer is a carboxylic acid moiety-containing vinyl polymer having a molecular weight that ranges between about 1,000 and about 2,000,000 and possessing an acid number of from about 100 to about 700. Throughout this patent document, reference to molecular weight is understood to mean number-average molecular weight ("Mn"), unless otherwise indicated.

The term "acid number" is herein defined as the number of milligrams of potassium hydroxide that are required to neutralize the pendant, acidic acid moieties that are present in a one-gram sample of the above-mentioned vinyl polymer. Neutralization occurs at pH 7; and the neutralization determination is generally performed by titrating the sample in distilled water at an ambient temperature of about 25 degrees Celsius using phenolphthalein as an endpoint indicator.

Acid-functional vinyl polymers that are suitable for purposes of my invention have at least two carboxylic acid-functional pendant moieties. Suitable vinyl polymers, in this regard, comprise 10-90 weight-percent ("wt.-%") of an acid-functional vinyl monomer, 10-90 wt.-% of an aromatic vinyl monomer, and 0-40 wt.-% of a non-aromatic monomer.

Suitable acid-functional vinyl monomers include but are not limited to aconitic acid, acrylic acid, beta-carboxyethyl acrylate, cinnamic acid, crotonic acid, fumaric acid, itaconic acid, maleic acid, methacrylic acid, and mixtures thereof. Also suitable are certain monomers that are said to contain so-called "latent"-acid moieties, such as cyclic anhydrides. Accordingly, suitable cyclic anhydrides include but are not limited to itaconic anhydride, maleic anhydride, and mixtures thereof.

Suitable aromatic vinyl monomers include but are not limited to styrene, alpha-methyl styrene, beta-methyl styrene, cis-stilbene, trans-stilbene, para-methyl styrene, tert-butyl styrene, vinyl naphthalene, and various mixtures and combinations thereof.

Suitable non-aromatic monomers include but are not limited to alpha-olefins; vinyl esters and ethers; acrylate and methacrylate esters; acrylamides and methacrylamides; vinyl amides; and various mixtures and combinations thereof.

Preferably, the amount of volatile base that is present in the aqueous blend, relative to the acid-functional vinyl polymer that is present, is between about 100 to about 350 mole percent ("mol.-%").

Preferably, the amino-functional siloxane polymer is an alkylamino moiety-containing silicone polymer that is water-insoluble. Such an amino-functional siloxane polymer has a molecular weight range of about 1,000 to about 30,000 and a viscosity that ranges between about 10 and about 5000 centipoises ("cPs."). The term "water insoluble" is herein defined to mean less than 1 gram of amino-functional siloxane polymer, in solution at a temperature of about 25 degrees Celsius, per 1000 grams of distilled water.

The amount of amino-functional siloxane polymer that is present in the polymeric blend, relative to the acid-functional vinyl polymer that is present, is between about 0.1 weight percent ("wt.-%") to about 40 wt.-%. Preferably, the amount of amino-functional siloxane that is present in the polymeric blend, relative to the acid-functional vinyl polymer that is present, is about 0.1–20 wt.-%.

Amino-functional siloxane polymers that are suitable for purposes of my invention are structurally defined as follows.

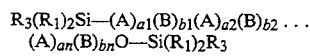

wherein "A" is structurally represented by

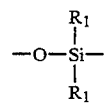

wherein "B" is structurally represented by

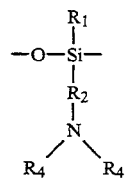

and wherein the sums of "a1"+"a2"+ ... "an" as well as of "b1"+"b2"+ ... "bn" are, independently, each an integer ranging in value from 1 to 300, inclusive.

The remainder of the above-presented chemical structure is defined as follows.

$R_1$ is representative of a monovalent radical such as alkyl (e.g. $C_1$–$C_4$), phenyl, and combinations thereof. $R_2$ represents a divalent radical such as an alkylene moiety having 2–20 carbon atoms, an arylene moiety having 6–20 carbon atoms, an aryl-alkylene moiety having 7–20 carbon atoms, and combinations thereof. $R_3$ represents a monovalent radical such as alkyl (e.g. $C_1$–$C_4$); a phenyl; an amino-containing alkyl group, or aryl group, or arylalkyl group; and combinations thereof. $R_4$ represents hydrogen, a monovalent radical such as those listed for $R_3$, and combinations thereof.

Such a structure is thus indicative of a randomly substituted polysiloxane copolymer.

Method Of Making Quasi-Crosslinked Polymeric Network

One method of producing a polymeric blend for purposes of applying a quasi-crosslinked, alkali-soluble polymeric network onto a suitable substrate is to combine at least one acid-functional vinyl polymer of the sort described above, with an amount of volatile aqueous media that is effective for dissolving the vinyl polymer, for purposes of producing an aqueous solution. Then, into the aqueous solution is added base in an amount that is effective for purposes of dissolving the acid-functional vinyl polymer and rendering the acid-functional moieties of the vinyl polymer (in the aqueous solution) non-reactive with respect to amino-functional moieties (therein).

Next, while the aqueous solution is being agitated, at least one amino-functional siloxane polymer is incorporated into the vinyl polymer-containing aqueous solution, wherein the amount of the amino-functional siloxane polymer in the aqueous solution is effective, while the pH of the media is maintained at 7.5 or more, for purposes of producing aqueous media containing dissolved vinyl polymer and dissolved or dispersed siloxane polymer. In such aqueous media, the ratio of amino-functional moieties (of the siloxane polymer) to acid-functional moieties (of the vinyl polymer) are about 1:10,000 to about 1:2.5. Such aqueous media, as was briefly mentioned above, includes volatile components.

Then, a portion of the polymer-containing volatile aqueous media is applied onto the substrate; and, thereafter, the volatile components—including the volatile base—are evaporated from the substrate-applied polymeric composition-containing volatile aqueous media, thereby producing a film comprising the above-mentioned quasi-crosslinked, alkali-soluble polymeric network, on the substrate.

When it is desirable to remove the film comprising the quasi-crosslinked polymeric network from the substrate, an effective amount of base is applied to the so-called "quasi-crosslinked" polymeric network for purposes of dissolving the polymeric network; whereupon, the now-dissolved polymer can readily be removed from the substrate.

While not wanted to be tied to theory, yet desirous of providing a complete disclosure, it is presently postulated that alkali-soluble quasi-crosslinking, present throughout the polymeric network, occurs, after evaporation of the volatile base and other volatile components, as a result of the formation of ionic bonds, which are caused to form as between the acid-functional moieties of the vinyl polymer component and the amino-functional moieties of the siloxane polymer component of the blended polymeric compositions discussed herein.

It will also be apparent to those skilled in the art that the "quasi-crosslinked" blends may be prepared using well known techniques for blending polymers, such as melt blending or blending the polymers in a mutual solvent and removing the solvent thereafter.

DETAILED DESCRIPTION OF EXAMPLES

The following examples are set forth to illustrate more clearly, to those skilled in the art, the various principles and practice of this particular invention. Yet as such, they are not intended to limit my invention but rather are merely illustrative of the so-called "best mode" aspects and/or features of my invention, and as such are thus characterized as preferred embodiments.

In the various examples which follow, the molecular weight of each polymer was determined via gel permeation chromatography ("GPC") techniques, using tetrahydrofuran ("THF") as eluent and poly(styrene) standards. The poly(styrene) standards thus utilized, which are presently available from Polymer Laboratories, Limited, of Church Stretton, Great Britain, are more particularly characterized as having number-average molecular weights of 2,250,000; 1,030,000; 570,000; 156,000; 66,000; 28,500; 9,200; 3,250; and 1,250.

EXAMPLE 1

Quasi-Crosslinked Polymeric Film And Method Of Producing The Same

One preferred embodiment of my novel polymeric blend was utilized to cast a "quasi-crosslinked" polymeric network, as a film, on commercially-available polypropylene.

In particular, to achieve such a result, 40 grams of an alkali-soluble acid-functional vinyl polymer was combined—at a temperature of about 25 degrees Celsius over a time period of about 20 minutes—with 160 grams of an aqueous ammonia ($NH_3$) solution to produce vinyl polymer-containing volatile aqueous media having 1.4 equivalents of $NH_3$ per equivalent of acid-functional moiety of the vinyl polymer. Thus, the vinyl polymer-containing volatile aqueous media contained 20 weight percent polymer, based upon total weight. Such vinyl polymer, prepared in accordance with the principles of U.S. Pat. No. 4,546,160 to Brand et al., included about 37.4 weight percent ("wt.-%") alpha-methyl styrene monomer, about 30.7 wt.-% styrene monomer, about 31.9 wt.-% acrylic acid monomer Such a polymer had a number-average molecular weight of about 4,000. The aqueous ammonia solution that was thus-utilized is more particularly prepared by diluting 15.7 milliliters of 28 wt.-% aqueous ammonia with distilled water to a total volume of 200 milliliters ("mLs".).

The thus-prepared vinyl polymer-containing volatile aqueous media was then divided into two (2) equal 100-gram portions. One such 100-gram portion was set aside for "control" purposes.

To the other such 100-gram portion of the vinyl polymer-containing volatile aqueous media was added—at an ambient temperature of about 25 degrees Celsius and over a time period of about 5 minutes—about 2.2 grams of an amino-functional siloxane polymer having a molecular weight of about 8,000, a viscosity of 550–600 centistokes ("cstks."), and a "base" equivalent value of about 2.0 milli-equivalents per gram of fluid. Such amino-functional siloxane polymer, obtained from Wacker Silicones Corporation of Adrian, Mich., is more particularly referred to as "EF 14882" siloxane polymer.

Those skilled in the art know full well that the term "poise" is the so-called "cgs" unit of viscosity; that one poise is equivalent to one-hundred (100) centipoises ("cPs."); that the term "stoke" is the so-called "cgs" unit of kinematic viscosity; that one stoke is equivalent to one-hundred (100) centistokes ("cstks."); that the so-called "cgs" unit of density is expressed in grams per cubic centimeter; and that the viscosity value is equivalent to the product of the kinematic viscosity and the density values. Thus, the viscosity value, expressed in cgs units, is arrived at by multiplying the kinematic viscosity value, as expressed in cgs units, by the density value, also expressed in cgs units.

For purposes of the present invention, a suitable amino-functional siloxane polymer will possess the following chemical structure.

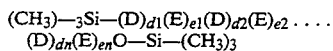

wherein "D" is structurally represented by

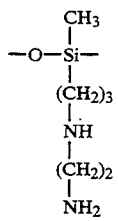

wherein "E" is structurally represented by

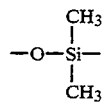

wherein the sums of "d1"+"d2"+ ... "dn" as well as of "e1"+"e2"+ ... "en" are each an integer ranging in value from 1 to 100, inclusive.

The above-presented chemical structure thus represents a random silicone copolymer containing at least one amino-functional sidechain.

Initially, the thus-added siloxane polymer was observed to form a layer, separate from the vinyl polymer-containing volatile aqueous media. Then, with moderate agitation, over a time period of about one (1) minute and at an ambient temperature of about 25 degrees Celsius, the vinyl polymer-containing and siloxane polymer-containing volatile aqueous media was observed to become a cloudy mixture. However, upon further moderate agitation over an additional time period of about four (4) minutes—while still at 25 degrees Celsius—the volatile aqueous media was subsequently observed to become a clear, seemingly homogeneous solution. The pH of the thus-produced clear solution, containing dissolved vinyl polymer and dissolved siloxane polymer, was observed to be about 9.5.

Next, the alkaline solution described immediately above (and containing dissolved vinyl polymer and dissolved siloxane polymer) was compared to the above-described "control", namely the vinyl polymer-containing volatile aqueous media (without the amino-functional siloxane polymer), as follows. In particular, 100-gram quantities of the above-described alkaline solution as well as the "control" were each applied to a respective polypropylene test coupon.

After evaporation of the volatile components of each such substrate-applied polymer-containing respective liquid sample at a temperature of about 25 degrees Celsius, such evaporation taking about 10 hours, a transparent film was observed to form on each of the polypropylene test coupons. The thus-produced vinyl polymer-containing and silicone polymer-containing film was found to be relatively more slippery than the thus-produced vinyl polymer-containing film (which did not contain silicone polymer). Yet each such film was found to be readily soluble in alkali.

Thereafter, about ten (10) grams of the thus-produced vinyl polymer-containing and silicone polymer-containing film was crushed by hand and subsequently placed into a "Soxhlet" extraction thimble. The contents of the thimble were then subjected to known extraction methods, over a time period of about 4 hours, utilizing 250 milliliters ("mLs.") of American Chemical Society ("ACS") reagent-grade commercially-available hexanes (typically utilized as refluxing solvent) in a conventional "Soxhlet" extraction apparatus. Such ACS reagent-grade hexanes were purchased from Aldrich Chemical Company of Milwaukee, Wis.

The above-described procedure was followed to separately produce a 10-gram "control" quantity of the vinyl polymer-containing film (i.e., the film not containing the silicone polymer).

The thus-produced hexane extraction solutions were then separately dried over potassium carbonate, a commercially-available drying agent, and thereafter filtered.

The hexanes and the other volatile materials were thereafter removed at about 0.1 Torricelli ("torr."), utilizing conventional vacuum equipment.

The hexane-soluble, non-volatile material that remained after evaporation of the volatile materials was then weighed on a conventional analytical balance and was found to have a weight of 0.0102 grams in total. In contradistinction, that portion of the hexane-soluble 10-gram film sample which did not contain silicone was determined by analytical balance to be about 0.0037 grams in weight. The silicone polymer itself was observed to be readily soluble in the hexanes thus utilized.

Additional dry films of the polymeric blend of Example 1 were prepared, substantially as described above, and the solubility of such films in various solvents was determined. In particular, film solubility of dried films was determined utilizing 50-gram quantities of the above-described vinyl polymer-containing and silicone polymer-containing aqueous solution of Example 1. The solubility of the dried films was visibly examined by placing 0.1 grams of the film into 5 mLs. of a particular solvent. Films produced from the polymeric blend of Example 1 were observed to be generally insoluble in a wide assortment of common solvents. Such common solvents, observed in this regard, included hexanes, toluene, diethyl ether, tetrahydrofuran ("THF"), methylene chloride, and water.

The film was observed to swell slightly when thus-tested utilizing either isopropanol or ethanol as the solvent. The film was observed to become highly swollen, when thus-tested in methanol, and appeared as an opaque gel.

A second "control" was prepared from a 50-gram portion of the above-described vinyl polymer-containing aqueous solution which did not contain silicone. The solubility behavior was found to be substantially the same as for the above-discussed vinyl polymer containing and silicone polymer containing films except that the second control was observed to dissolve readily in methanol, and that the film when so dissolved thus provided a clear solution.

These solubility observations are summarized in Table I, below. The blended compositions included 10 wt.-% silicone containing polymer.

TABLE I

Solubility Of Silicone-Containing And Vinyl Polymer-Containing Blended Compositions And Control In Various Solvents

| Solvent | Silicone-Containing And Vinyl Polymer-Containing Blended Compositions | Control |
|---|---|---|
| hexanes | I | I |
| toluene | I | I |
| diethyl ether | I | I |
| tetrahydrofuran | I | I |
| methylene chloride | I | I |
| isopropyl alcohol | SL. S. | SL. S. |
| ethyl alcohol | SL. S. | SL. S. |
| methyl alcohol | SW | S |
| water (pH = 7.0) | I | I |
| water (pH = 10.0) | S | S |

I = Insoluble, SL. S. = Slightly Soluble or Slightly Swellable, S = Soluble, SW = Swellable.

EXAMPLE 2

Quasi-Crosslinked Polymeric Films And Contact-Angle Measurements Thereof

To illustrate the effect of incorporation of silicone upon certain physical properties of the polymeric films of this invention, a series of vinyl polymer-containing and silicone polymer-containing aqueous solutions were prepared substantially in the manner described above in connection with Example 1 except that the amount of silicone polymer in the aqueous solution was varied to demonstrate the corresponding variation in contact angle, as is shown in Table II below.

Generally speaking, the higher the contact angle, the greater is the resistance to water wetting the surface.

TABLE II

Water Contact Angle As A Function Of Wt.-% Silicone In Silicone-Containing And Vinyl Polymer-Containing Blended Compositions

| Wt.-% Amine-Functional Silicone | Contact Angle (degrees) |
|---|---|
| 0.0 | 84.7 ± 1.3 |
| 1.4 | 87.0 ± 3.6 |
| 2.6 | 91.5 ± 0.7 |
| 5.9 | 93.1 ± 1.8 |
| 10.3 | 95.2 ± 1.3 |

Pre-cleaned commercially-available glass microscope slides (purchased from Corning Glass Works, of Corning, N.Y.) were coated with a 25-micron thick layer of each one of those above-mentioned aqueous polymeric blends (produced substantially via the method of Example 1), using an adjustable micrometer ("MICROM") film applicator (or so-called "Doctor Blade") purchased from Paul N. Gardner Company, Inc., of Pompano Beach, Fla. The glass microscope slides, coated with the thus-prepared aqueous polymer blends, were then permitted to dry at an ambient temperature of about 25 degrees Celsius over a time period of about 24 hours. Upon drying, the glass slides were observed to be coated with a clear, brittle film.

The contact angle of water on the film-coated slides was then measured, in a known manner, utilizing a conventional Rame'-Hart Model 100-07-00 relective goniometer, manufactured by Rame'-Hart, Inc. of Mountain Lakes, N.J.

A 5-microliter aliquot droplet of de-ionized water was placed on each thus-described film-coated microscope slide, and was subsequently allowed to come to equilibrium at an ambient temperature of about 25 degrees Celsius over a time period of about 1 minute. Thereafter, the contact angle of the droplet of water was measured.

The measurement was made at least 3 times on each plate.

The results are reported in Table II, above.

EXAMPLE 3

Preparation Of Another Quasi-Crosslinked Polymeric Film

Another preferred embodiment of my novel polymeric blend was similarly utilized to produce another quasi-crosslinked polymeric network on polypropylene, in accordance with the method set forth above in Example 1.

In particular, the quasi-crosslinked polymeric network, cast as a film on the commercially-available polypropylene, was prepared in substantially the same manner as described above in connection with Example 1, except that the alkali-soluble acid-functional vinyl polymer utilized (also made in accordance with the principles of U.S. Pat. No. 4,546,160) included about 59.3 wt.-% styrene monomer, about 32.7 wt.-% acrylic acid monomer, and about 8 wt.-% alpha-methyl styrene, and had a number-average molecular weight of about 4,000.

The thus-described vinyl-containing and silicone-containing aqueous polymeric blends of Example 3 became clear in substantially the same manner, as described above, in connection with Example 1. The resultant films were similarly observed to be clear.

Accordingly, the solubility observations of Example 3 are summarized in Table III, below. The blended compositions included 10 wt.-% of the silicone-containing polymer.

TABLE III

Solubility of Silicone-Containing and Vinyl Polymer-Containing Blended Compositions

| Solvent | Silicone-Containing And Vinyl Polymer-Containing Blended Compositions | Control |
|---|---|---|
| hexanes | I | I |
| toluene | I | I |
| diethyl ether | I | I |
| tetrahydrofuran | I | I |
| methylene chloride | I | I |
| isopropyl alcohol | SL. S. | SL. S. |
| ethyl alcohol | SL. S. | SL. S. |
| methyl alcohol | SW | S |
| water (pH = 7.0) | I | I |
| water (pH = 10.0) | S | S |

I = Insoluble, SL. S. = Slightly Soluble or Slightly Swellable, S = Soluble, SW = Swellable.

The contact-angle observations of Example 3 are summarized in Table IV, below.

TABLE IV

Water Contact Angle As A Function Of Wt.-% Silicone In Silicone-Containing And Vinyl Polymer-Containing Blended Compositions

| Wt.-% Amine-Functional Silicone | Contact Angle (degrees) |
|---|---|
| 0 | 79.1 ± 2.2 |
| 1.1 | 86.5 ± 1.3 |
| 2.3 | 90.8 ± 0.5 |
| 5.1 | 94.2 ± 1.1 |
| 9.9 | 95.0 ± 0.9 |

EXAMPLE 4

Preparation Of Yet Another Quasi-Crosslinked Polymeric Film

To further illustrate my invention, 0.5 grams of "F-756" brand amino-functional silicone fluid, manufactured by Wacker Silicones Corporation of Adrian, Michigan, was added to a stirred solution of 4.5 grams of the above-described vinyl polymer of Example 3 in 20 grams of a 2.5 molar ("M") solution of aqueous ammonia. "F-756" brand silicone fluid is perhaps more particularly characterized as a so-called "alkylene diamino functional" polydimethyl siloxane fluid having a molecular weight of about 1350, a viscosity of about 20 cPs. (at an ambient temperature of 25 degrees Celsius), and a "base" equivalent value of 1.5 milli-equivalents of base per gram of fluid.

The addition of the "F-756" brand silicone, with moderate agiation, was initially observed to change the clear aqueous solution of the above-described vinyl polymer to a cloudy mixture. After about 4 minutes of moderate agitation, such a cloudy mixture was observed to become a clear liquid. Dried films, produced from the thus-described polymeric blend of Example 4, and utilizing the film-forming method described above in Example 1, were similarly observed to become clear, brittle solids upon evaporation of the volatile components.

The various solvent-solubility observations of Example 4 are summarized in Table V, below. The blended compositions included 10 wt.-% silicone containing polymer.

TABLE V

Solubility of Silicone-Containing and Vinyl Polymer-Containing Blended Compositions

| Solvent | Silicone-Containing And Vinyl Polymer-Containing Blended Compositions | Control |
| --- | --- | --- |
| hexanes | I | I |
| toluene | I | I |
| diethyl ether | I | I |
| tetrahydrofuran | I | I |
| methylene chloride | I | I |
| isopropyl alcohol | SL. S. | SL. S. |
| ethyl alcohol | SL. S. | SL. S. |
| methyl alcohol | SW | S |
| water (pH = 7.0) | I | I |
| water (pH = 10.0) | S | S |

I = Insoluble, SL. S. = Slightly Soluble or Slightly Swellable, S = Soluble, SW = Swellable.

The contact-angle observations of Example 4 are summarized in Table VI, below.

TABLE VI

Water Contact Angle As A Function Of Wt.-% Silicone In Silicone-Containing And Vinyl Polymer-Containing Blended Compositions

| Wt.-% Amine-Functional Silicone | Contact Angle (degrees) |
| --- | --- |
| 0 | 79.1 ± 2.2 |
| 0.9 | 84.8 ± 1.4 |
| 2.2 | 89.9 ± 1.2 |
| 4.8 | 92.7 ± 0.7 |
| 10.2 | 95.4 ± 1.0 |

EXAMPLE 5

Preparation Of A Quasi-Crosslinked Polymer Film From An Opaque Solution

Another example of my invention is illustrated by the incorporation of the amino-functional siloxane of Example 1 into an opaque aqueous ammonia-containing and vinyl polymer-containing solution.

An opaque polymeric solution was accordingly prepared by adding 10 grams of a vinyl polymer to 40 grams of a 3.0M aqueous ammonia solution.

The vinyl polymer is perhaps more particularly characterized as a 28.9 wt.-% styrene/25.9 wt.-% 1-decene/45.2 wt.-% maleic anhydride copolymer. The aforementioned copolymer was prepared by methods similar to those described in U.S. Pat. Nos. 4,358,573 and 4,522,992, both to Verbrugge. The thus-produced copolymer was observed to have a number-average molecular weight ("Mn") of about 3000.

The thus-produced opaque polymeric solution was then separated into two (2) 25-gram portions. To one such 25-gram portion of cloudy polymeric solution was added 0.5 grams of the above-described "EF 14882" brand amino-functional silicone fluid, utilizing moderate agitation thereby producing a mixture. The resultant mixture was then further stirred for about five (5) minutes at an ambient temperature of about 25 degrees Celsius. After stirring, the mixture was observed to remain cloudy; but no separation of the silicone ingredient from the remainder of the mixture was observed to occur.

The second 25-gram portion of cloudy copolymer solution was saved for subsequent use as a "control".

In particular, the solutions were compared with respect to appearance, after storing for three days at a temperature of 25 degrees Celsius. No visual differences, such as separation or precipitation, were observed as between the copolymer-containing and silicone-containing mixture and the "control". Films from both solutions were observed to be clear.

EXAMPLES 6–12

Novel Polymeric Blend Combined With Known Polymeric Film-Forming Ingredients In the following examples, my novel polymeric blend was combined with known polymeric film-forming ingredients, to produce "quasi-crosslinked" polymeric networks. Such polymeric networks, able to be applied to a wide assortment of substrate surfaces, similarly exhibit the desirable water-resistance physical properties mentioned above.

Briefly, seven (7) aqueous polymeric mixtures—Examples 6 through 12—were produced from the novel polymeric blend of my invention, in combination with a polymeric film-forming composition or formulation. In particular, Example 6, which contained no silicone (and which is thus not within the scope of my invention), served as a "control". Specific details are as follows.

About 70 grams of the vinyl polymer-containing volatile aqueous media, was prepared, as discussed above in connection with Example 1, except that the vinyl polymer-containing volatile aqueous media contained 30 weight percent polymer, based upon total weight. The thus-prepared vinyl polymer-containing volatile aqueous media was next divided into seven (7) equal portions of about 10 grams each. Into each such 10-gram volatile aqueous media portion was added, at an ambient temperature of about 25 degrees Celsius, a measured amount of the amino-functional siloxane polymer, discussed above in connection with Example 1, to produce an aqueous polymeric composition; and the compositional make-up of these seven (7) aqueous polymeric compositions are summarized in Table VII, below.

TABLE VII

Aqueous Polymeric Compositions Produced From The Volatile Aqueous Media And Siloxane Polymer of Example 1

| Aqueous Polymeric Compositions | Amount of Siloxane Polymer Contained |
|---|---|
| "A" | 0.00 grams |
| "B" | 0.04 grams |
| "C" | 0.08 grams |
| "D" | 0.16 grams |
| "E" | 0.32 grams |
| "F" | 0.48 grams |
| "G" | 0.64 grams |

A 5-gram, representative portion of each one of the seven (7) above-listed aqueous polymeric compositions was then combined, utilizing moderate agitation, with a respective 5-gram, representative portion of a particular polymeric emulsion, to produce a polymeric mixture, discussed in detail below.

Before discussing the polymeric mixture, however, the composition of the polymeric emulsion shall briefly be discussed. The polymeric emulsion, a known film-forming composition, consisted of 13.9 parts-by-weight of the alkali-soluble acid-functional vinyl polymer discussed above in connection with Example 1, 50 parts-by-weight of an aqueous ammonia solution, and 36.1 parts-by-weight of a polymer-containing colloid. The pH of the thus-produced polymeric emulsion was about 8.3.

The polymer-containing colloid, a known film-forming ingredient, was produced in accordance with methods set forth below in Example 13 (below), except that no amino-functional siloxane polymer was utilized. More particularly, the polymer-containing colloid was produced from a monomer mixture that consisted of about 9 parts-by-weight of butyl acrylate monomer, about 41 part-by-weight of methyl methacrylate monomer, and about 50 parts-by-weight of 2-ethylhexyl acrylate monomer. The polymeric materials of the polymeric emulsion (which included the colloid and the acid-functional vinyl polymer) were determined via gel permeation chromatography ("GPC") techniques as having a number-average molecular weight ("Mn") of about 5,500 and a weight-average molecular weight ("Mw") of about 200,000.

Each one of the seven (7) aqueous polymeric mixtures was then applied to a substrate utilizing methods set forth above in Example 2, to produce seven (7) different surface coatings. With respect to these surface coatings, the water-contact angle as a function of the weight-percent ("wt.-%") amine-functional silicone in each aqueous polymeric mixture, was determined in accordance with methods set forth above in Example 2, and those results are summarized in Table VIII, below.

TABLE VIII

Water Contact Angle As A Function of Wt.-% Silicone In Aqueous Polymeric Mixture

| Example No. | Wt.-% Amine-Functional Silicone | Contact Angle (degrees) |
|---|---|---|
| 6 | 0.0 | 79.4 ± 4.4 |
| 7 | 0.5 | 97.9 ± 1.8 |
| 8 | 1.0 | 97.0 ± 2.5 |
| 9 | 2.0 | 98.1 ± 2.3 |
| 10 | 3.9 | 97.0 ± 1.8 |
| 11 | 5.7 | 96.0 ± 3.0 |
| 12 | 7.5 | 98.5 ± 1.2 |

EXAMPLE 13

Emulsion-Polymerization Method To Produce A Novel Film-Forming Formulation

My novel silicone-containing polymeric composition can also be utilized, in conjunction with conventional emulsion-polymerization methods or techniques, to produce novel film-forming compositions or formulations. Specific details shall now be discussed.

A monomer mixture was prepared by combining the ingredients, set forth in Table IX (below), at an ambient temperature of about 25 degrees Celsius, into a conventional 250-milliliter flask over a time period of about 10 minutes, utilizing moderate agitation.

TABLE IX

Monomer Mixture Ingredients

| Ingredient | Function | Weight |
|---|---|---|
| 2-Ethylhexyl Acrylate | Polymerizable Monomer | 50.4 grams |
| Methyl Methacrylate | Polymerizable Monomer | 41.7 grams |
| Butyl Acrylate | Polymerizable Monomer | 8.9 grams |
| Triton X-45 | Emulsifier | 3.9 grams |

The above-presented emulsifier is more particularly characterized as a liquid nonionic octylphenoxy polyethoxy ethanol having an HLB value of 10.4. Those skilled in the emulsion art know that the so-called "HLB" value is more particularly understood to mean the hydrophile-lipophile balance value. (See, e.g., U.S. Pat. No. 3,997,492 to Kane et al.) The above-presented emulsifier, moreover, can be purchased from the Rohm and Haas Company of Philadelphia, Pa., under the "TRITON X-45" brand name. (See, e.g., page 192 of "McCutcheon's" *Emulsifiers & Detergents*, volume 1, North American Edition, published in 1990 by the MC Publishing Company of Glen Rock, N.J.)

Those skilled in the art of emulsion-polymerization know that suitable emulsifiers (or surfactants) can be selected from anionic emulsifiers, cationic emulsifiers, nonionic emulsifiers, amphoteric emulsifiers, and combinations thereof. (See, e.g., page 31 of the Jan. 28, 1991 issue of *Chemical & Engineering News*, volume 69, number 4, published by the American Chemical Society.)

The above noted 250-milliliter flask, which thus contained a polymerizable monomer mixture, is designated as "Flask No. 1" throughout the remaining discussion concerning Example 13 hereinbelow.

Separately, a conventional 500-milliliter 4-necked flask ("Flask No. 2"), equipped with a stirrer and heating means, was obtained. Into Flask No. 2 was added, utilizing moderate agitation, 130.8 grams of the vinyl polymer-containing volatile aqueous media having a pH of about 8.5 and produced as discussed above in connection with Examples 6 through 12, 48.2 grams of de-ionized water, 1.5 grams of the amino-functional siloxane polymer discussed above in connection with Example 1, and 3.6 grams of "POLYGLYCOL P-1200" brand non-ionic emulsifier, obtained from the Dow Chemical Company of Midland, Mich. The contents of Flask No. 2 were then stirred, utilizing moderate agitation, and heated over a time period of about 30 minutes, to a desired emulsion-polymerization reaction temperature of about 88 degrees Celsius, while nitrogen (an inert gas) was maintained in the headspace of Flask No. 2. Upon achieving the desired emulsion-polymerization reaction temperature, into the stirred, heated contents of Flask No. 2 was added 0.89 grams of ammonium persulfate (a free-radical initiator) in 13.6 grams of de-ionized water, while maintaining the desired reaction temperature.

Two minutes after thus-adding the initiator, while maintaining the desired reaction temperature, the above-described monomeric mixture within Flask No. 1 was incorporated into the contents of Flask No. 2 at a uniform rate over a period of about 65 minutes, utilizing moderate agitation. Finally, the now-polymerizing reaction mixture within Flask No. 2 was stirred for an additional 30 minutes, while the desired reaction temperature of 88 degrees Celsius was maintained, before the heat was removed. The resulting product was a white polymeric emulsion containing only slight amounts of coagulum.

The above procedure was repeated, except that the amino-functional siloxane polymer ingredient was excluded, for purposes of producing a "control" polymeric emulsion.

Both polymeric emulsions contained about 48.4 weight percent nonvolatiles on a total weight basis.

Films were prepared from both polymeric emulsions, in accordance with methods set forth in Example 2 (above).

The water-contact angle characterization of these two films are summarized in Table X, below.

TABLE X

| Film Produced | Wt.-% Amino-Functional Silicone | Contact Angle (Degrees) |
|---|---|---|
| "Control" | 0.0 | 87.2 ± 1.8 |
| Ex. 13 | 1.0 | 94.7 ± 2.1 |

What has been described herein is a novel polymeric blended composition. Also described is a novel quasi-crosslinked, alkali-soluble polymeric network that can be applied as a film or other surface coating on a suitable substrate. Methods of applying the novel blended polymeric compositions to the substrate for the purpose of producing the quasi-crosslinked, alkali-soluble polymeric network on the substrate are described herein as well. While the blended polymeric composition of my invention has been described with reference to several preferred embodiments or examples, it is to be understood that my invention is not to be limited to such preferred embodiments. Indeed, various alternatives, changes, and modifications will become apparent to those skilled in the art upon reading the foregoing description. It is to be understood, therefore, that such alternatives, changes and modifications are to be considered as forming a part of my invention insofar as they fall within the spirit and scope of the appended claims.

I claim:

1. An aqueous polymeric composition, able to produce an alkali-soluble polymeric network on a substrate upon evaporation of volatile components within the composition, produced by a method comprising the step of:

combining ingredients consisting essentially of an alkali-soluble acid-functional vinyl polymer and an amino-functional siloxane polymer in volatile aqueous media to form an aqueous vinyl polymer siloxane polymer mixture, wherein the vinyl polymer has at least two acid-functional pendant moieties, wherein the siloxane polymer has at least two amino-functional pendant moieties, wherein the aqueous media includes a volatile base in an amount that is effective for preventing the acid-functional moieties of the vinyl polymer from chemically reacting with the amino-functional moieties of the siloxane polymer, and wherein the amino-functional siloxane polymer is structurally defined as:

wherein "A" is structurally represented by

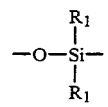

wherein "B" is structurally represented by

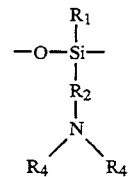

wherein "an" as well as "bn" are, independently, each an integer ranging in value from 1 to 300, inclusive, wherein $R_1$ is alkyl, phenyl, or combinations thereof, wherein $R_2$ is an alkylene moiety having 2-20 carbon atoms, an arylene moiety having 6-20 carbon atoms, an aryl-alkylene moiety having 7-20 carbon atoms, or combinations thereof, wherein $R_3$ is alkyl; phenyl; an amino-containing alkyl group, aryl group, arylalkyl group; or combinations thereof, and wherein $R_4$ is hydrogen; alkyl; phenyl an amino-containing alkyl group, aryl group, arylalkyl group; or combinations thereof.

2. The aqueous polymeric composition of claim 1 wherein the base is combined with the acid-functional vinyl polymer prior to combining the acid-functional vinyl polymer with the amino-functional siloxane polymer.

3. The aqueous polymeric composition of claim 1 wherein the acid-functional vinyl polymer contains a sufficient number of carboxylic acid moieties to possess an acid number between about 100 to 700 and the amount of volatile base present, relative to the carboxylic acid moieties, is between about 100 to about 350 mole percent.

4. The aqueous polymeric composition of claim 2 wherein the acid-functional vinyl polymer contains a sufficient number of carboxylic acid moieties to possess an acid number between about 100 to 700 and the amount of volatile base present, relative to the carboxylic acid moieties, is between about 100 to about 350 mole percent.

5. The aqueous polymeric composition of claim 1, wherein a polymeric film-forming ingredient is incorporated into the aqueous vinyl polymer siloxane polymer mixture.

6. The aqueous polymeric composition of claim 1, wherein the base is selected from the group consisting of volatile amines, ammonia, and mixtures thereof.

7. The aqueous polymeric composition of claim 6, wherein the volatile amines are selected from the group consisting of methyl amine, dimethyl amine, trimethyl amine, ethyl amine, diethyl amine, triethyl amine, propyl amine, isopropyl amine, di-isopropyl amine, dipropyl amine, butyl amine, sec-butyl amine, tert-butyl amine, and combinations thereof.

8. The polymeric composition of claim 1, wherein the acid-functional vinyl polymer is present in an amount of 60–99.9 parts-by-weight based on total weight of the aqueous vinyl polymer siloxane polymer mixture, and wherein the amino-functional siloxane polymer is present in an amount of 0.1–40 parts-by-weight, based upon total weight of the vinyl polymer siloxane polymer mixture.

9. The polymeric composition of claim 1, wherein the acid-functional vinyl polymer is present in an amount of 80–99.9 parts-by-weight based on total weight of the vinyl polymer siloxane polymer mixture, and wherein the amino-functional siloxane polymer is present in an amount of 0.1–20 parts-by-weight, based upon total weight of the vinyl polymer siloxane polymer mixture.

10. A method of producing an aqueous polymeric composition able to produce an alkali-soluble polymeric network on a substrate upon evaporation of volatile components within the composition, comprising:
combining ingredients consisting essentially of an alkali-soluble acid-functional vinyl polymer and an amino-functional siloxane polymer in volatile aqueous media to form an aqueous vinyl polymer siloxane polymer mixture, wherein the vinyl polymer has at least two acid-functional pendant moieties, wherein the siloxane polymer has a least two amino-functional pendant moieties, wherein the aqueous media includes a volatile base in an amount that is effective for preventing the acid-functional moieties of the vinyl polymer from chemically reacting with the amino-functional moieties of the siloxane polymer and wherein the amino-functional siloxane polymer is structurally defined as:

$R_3(R_1)_2Si—(A)_{an}(B)_{bn}O—Si(R_1)_2R_3$ wherein "A" is structurally represented by

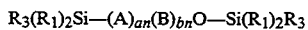

wherein "B" is structurally represented by

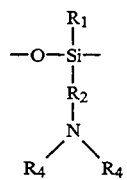

wherein "an" as well as "bn" are, independently, each an integer ranging in value from 1 to 300, inclusive, wherein $R_1$ is alkyl, phenyl, or combinations thereof, wherein $R_2$ is an alkylene moiety having 2–20 carbon atoms, an arylene moiety having 6–20 carbon atoms, an aryl-alkylene moiety having 7–20 carbon atoms, or combinations thereof, wherein $R_3$ is alkyl; phenyl; an amino-containing alkyl group, aryl group, arylalkyl group; or combinations thereof, and wherein $R_4$ is hydrogen; alkyl; phenyl; an amino-containing alkyl group, aryl group, arylalkyl group; or combinations thereof.

11. The method of claim 10, further including the step of incorporating a polymeric film-forming ingredient into the aqueous vinyl polymer siloxane polymer mixture.

12. The method of claim 10 wherein the base is combined with the acid-functional vinyl polymer prior to combining the acid-functional vinyl polymer with the amino-functional siloxane polymer.

13. The method of claim 10 wherein the acid-functional vinyl polymer contains a sufficient number of carboxylic acid moieties to possess an acid number between about 100 to 700 and the amount of volatile base present, relative to the carboxylic acid moieties, is between about 100 to about 350 mole percent.

14. The method of claim 12 wherein the acid-functional vinyl polymer contains a sufficient number of carboxylic acid moieties to possess an acid number between about 100 to 700 and the amount of volatile base present, relative to the carboxylic acid moieties, is between about 100 to about 350 mole percent.

15. A method of producing an alkali-soluble polymeric network on a substrate upon evaporation of volatile components within the composition, the method comprising the steps of:
combining ingredients consisting essentially of an alkali-soluble acid-functional vinyl polymer with volatile aqueous media which includes an effective amount of a volatile base for the purpose of rendering the acid-functional moieties of the vinyl polymer non-reactive chemically with respect to amino-functional moieties;
combining an amino-functional siloxane polymer into the volatile aqueous media, and moderately agitating the media, wherein the degree of agitation and the amount of amino-functional siloxane polymer that is present in the volatile aqueous media is effective for purposes of producing an alkaline solution containing dissolved vinyl polymer and dissolved or dispersed siloxane polymer, wherein the ratio of amino-functional moiety of the siloxane polymer to acid-functional moieties of the vinyl polymer is about 1:10,000 to about 1:2.5, to thereby produce a polymer-containing evaporable composition that includes volatile components, wherein the amino-functional siloxane polymer is structurally defined as:

$R_3(R_1)_2Si—(A)_{an}(B)_{bn}O—Si(R_1)_2R_3$ wherein "A" is structurally by

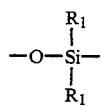

wherein "B" is structurally represented by

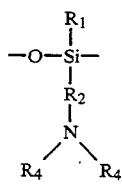

wherein "an" as well as "bn" are, independently, each an integer ranging in value from 1 to 300, inclusive, wherein $R_1$ is alkyl, phenyl, or combinations thereof, wherein $R_2$ is an alkylene moiety having 2-20 carbon atoms, an arylene moiety having 6-20 carbon atoms, an aryl-alkylene moiety having 7-20 carbon atoms, or combinations thereof, wherein $R_3$ is alkyl; phenyl; an amino-containing alkyl group, aryl group, arylalkyl group; or combinations thereof, and wherein $R_4$ is hydrogen; alkyl; phenyl; an amino-containing alkyl group, aryl group, arylalkyl group; or combinations thereof;

applying a portion of the polymer-containing evaporable composition onto a substrate; and evaporating the volatile components from the substrate-applied composition, thereby producing an alkali-soluble polymeric network on the substrate.

16. The method of claim 15 wherein the acid-functional vinyl polymer contains a sufficient number of carboxylic acid moieties to possess an acid number between about 100 to 700 and the amount of volatile base present, relative to the carboxylic acid moieties, is between about 100 to about 350 mole percent.

17. A method of producing an aqueous film-forming polymeric formulation, able to produce an alkali-soluble polymeric network on a substrate upon evaporation of volatile components within the composition, comprising:

combining preselected polymerizable monomeric ingredients, at a predetermined reaction temperature for a predetermined period of time, for purposes of producing an aqueous film-forming polymeric formulation, wherein polymerization of the monomeric ingredients takes place in the presence of a polymeric composition consisting essentially of an alkali-soluble acid-functional vinyl polymer and an amino-functional siloxane polymer, the vinyl polymer having at least two acid-functional pendant moieties, the siloxane polymer having at least two-amino-functional pendant moieties, wherein the amino-functional siloxane polymer is structurally defined as:

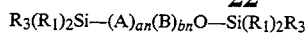

wherein "A" is structurally represented by

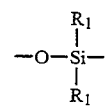

wherein "B" is structurally represented by

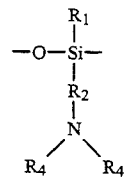

wherein "an" as well as "bn" are, independently, each an integer ranging in value from 1 to 300, inclusive, wherein $R_1$ is alkyl, phenyl, or combinations thereof, wherein $R_2$ is an alkylene moiety having 2-20 carbon atoms, an arylene moiety having 6-20 carbon atoms, an aryl-alkylene moiety having 7-20 carbon atoms, or combinations thereof, wherein $R_3$ is alkyl; phenyl; an amino-containing alkyl group, aryl group, arylalkyl group; or combinations thereof, and wherein $R_4$ is hydrogen; alkyl; phenyl; an amino-containing alkyl group, aryl group, arylalkyl group; or combinations thereof, wherein the polymeric composition further includes volatile aqueous media comprising a volatile base in an amount that is effective for preventing the acid-functional moieties of the vinyl polymer from chemically reacting with the amino-functional moieties of the siloxane polymer, wherein the amount of the polymeric composition in relation to the amount of the polymerizable monomeric ingredient, present in the aqueous polymeric formulation, is effective for enabling the aqueous polymeric formulation to be able to be utilized to produce an alkali-soluble polymeric network on a substrate.

18. The aqueous film-forming polymeric formulation produced in accordance with the method of claim 17.

19. The method of claim 17 wherein the base is combined with the acid-functional vinyl polymer prior to combining the acid-functional vinyl polymer with the amino-functional siloxane polymer.

20. The method of claim 17 wherein the acid-functional vinyl polymer contains a sufficient number of carboxylic acid moieties to possess an acid number between about 100 to 700 and the amount of volatile base present, relative to the carboxylic acid moieties, is between about 100 to about 350 mole percent.

21. The method of claim 19 wherein the acid-functional vinyl polymer contains a sufficient number of carboxylic acid moieties to possess an acid number between about 100 to 700 and the amount of volatile base present, relative to the carboxylic acid moieties, is between about 100 to about 350 mole percent."

* * * * *